Jan. 13, 1925.                                                     1,523,157
W. O. AMSLER
METHOD OF AND APPARATUS FOR MAKING GLASS
Filed April 25, 1921        3 Sheets-Sheet 3
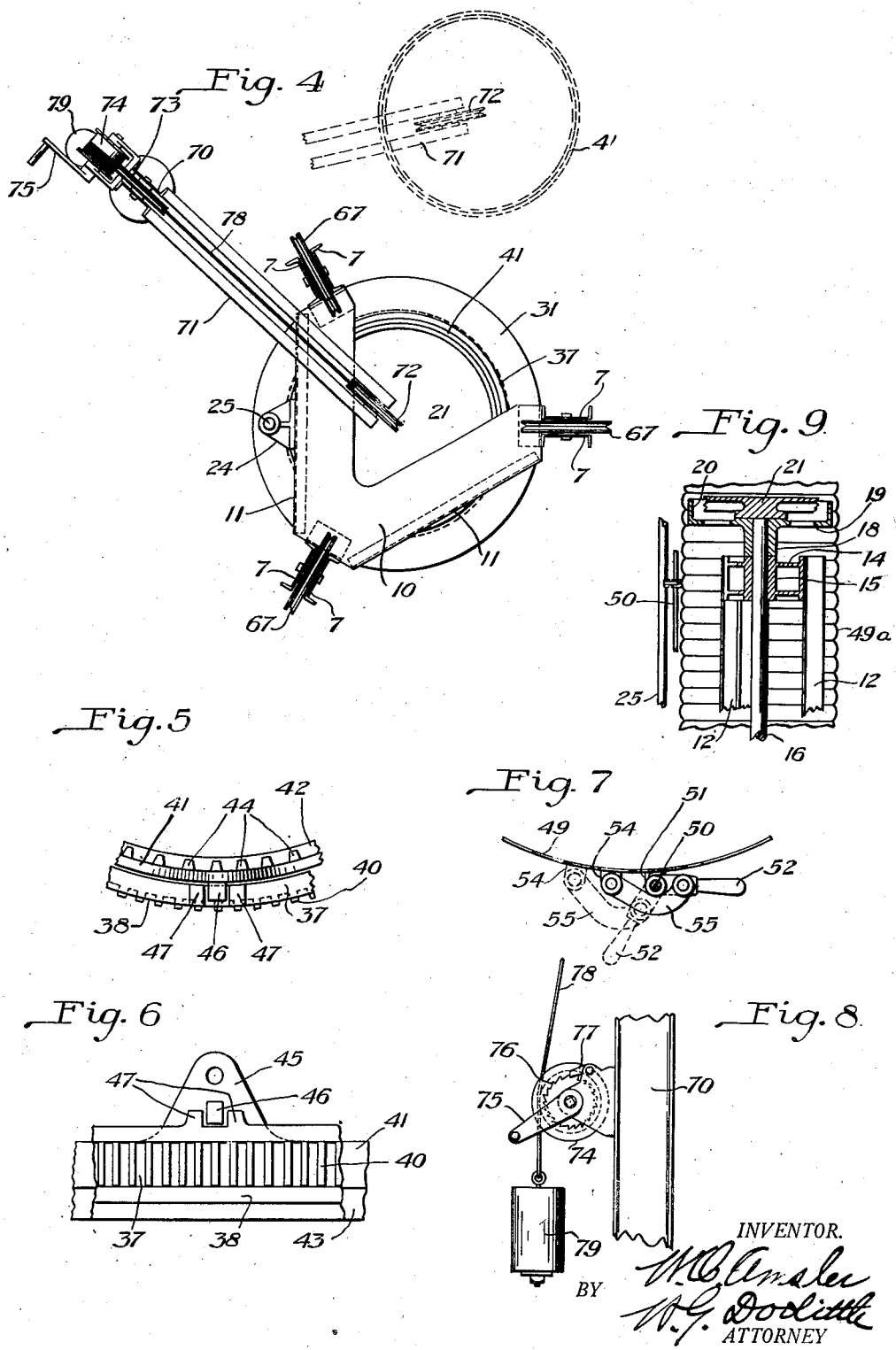

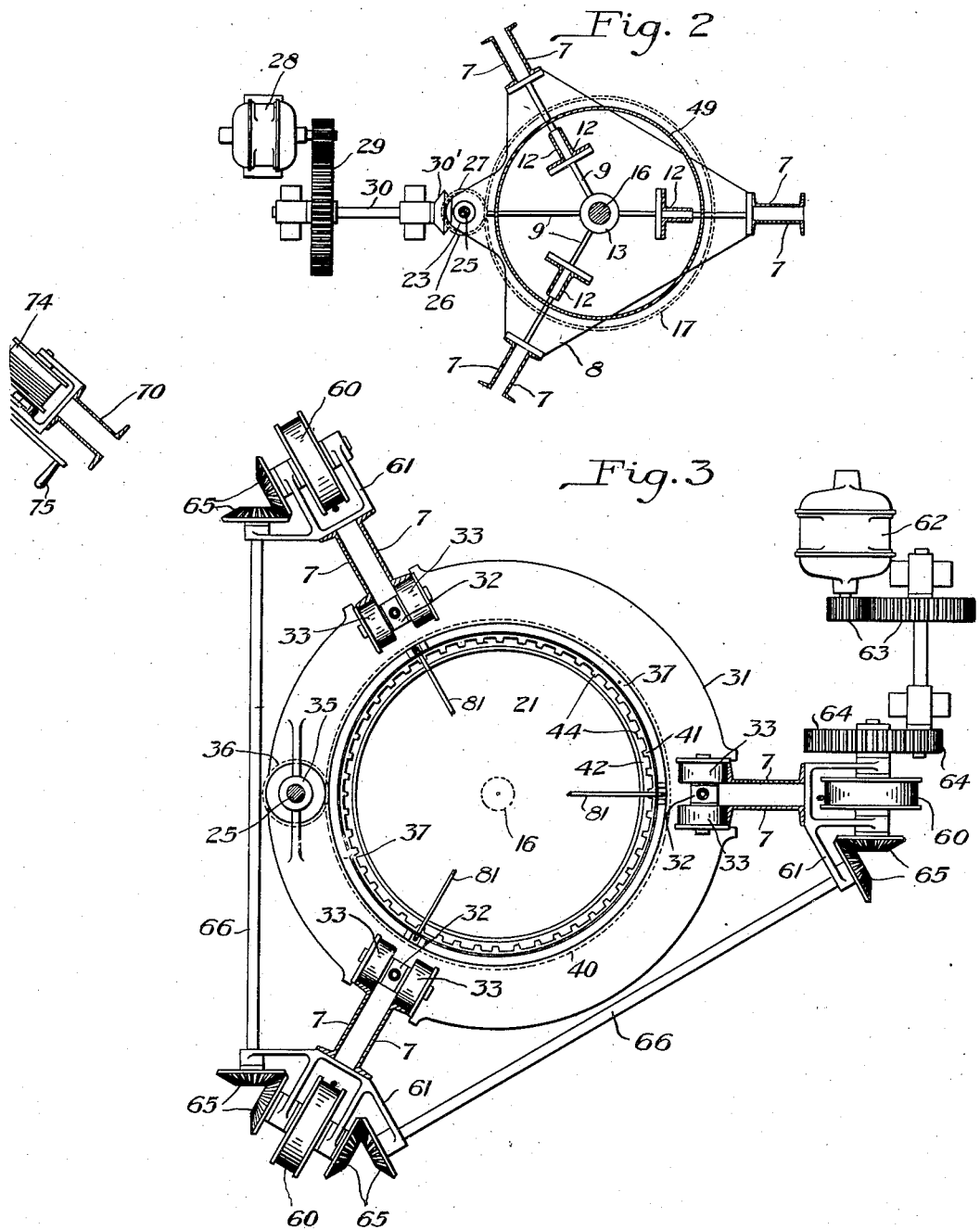

Patented Jan. 13, 1925.

1,523,157

UNITED STATES PATENT OFFICE.

WALTER O. AMSLER, OF PITTSBURGH, PENNSYLVANIA.

METHOD OF AND APPARATUS FOR MAKING GLASS.

Application filed April 25, 1921. Serial No. 464,188.

*To all whom it may concern:*

Be it known that I, WALTER O. AMSLER, a citizen of the United States, residing at Pittsburgh, in the county of Allegheny and State of Pennsylvania, have invented certain new and useful Improvements in Method of and Apparatus for Making Glass, of which the following is a specification.

This invention relates to a method of and machine for the manufacture of glass, and while it relates particularly to a method and machine for forming glass into cylinders which may be opened out into sheets for making window glass, it is also applicable to the formation of hollow glass articles for other purposes.

It has heretofore been the practice in forming glass cylinders, such as those used for the manufacture of window glass, to draw the cylinders by lowering a suitable bait ring into a pot of molten glass and then to raise it vertically while controlling the air pressure within the cylinder, which forms as the bait ring moves upward to prevent collapse of the cylinder or variations in the thickness of the glass.

An object of the present invention is to provide a new and improved method and apparatus utilizing centrifugal action in the formation of glass cylinders or other hollow glass articles rather than the well known drawing and blowing operations, thereby doing away with the compressed air plant and the accompanying labor and expense required to maintain and operate said plant.

Further objects are to provide means whereby cylinders and other hollow articles varying greatly in size and configuration may be economically made; to provide novel means for manipulating the apparatus before and after the formation of the cylinder, and to provide means for moving the article being formed longitudinally to its axis while the glass is being supplied thereto centrifugally.

My invention contemplates primarily the utilization of centrifugal action for throwing the glass outwardly, in forming cylinders and other hollow objects, with or without the employment of a mold and in drawing the glass article being formed away from the plane in which the glass is thrown by the centrifugal action.

According to one form of this invention, a mold and a receptacle containing molten glass are rotated, preferably at substantially the same speed while one is moved longitudinally relatively to the other. In the construction shown, the mold is moved longitudinally while the position of the pot for the molten glass is stationary. The relative movement of the pot throws the glass centrifugally outward against the interior of the cylindrical mold, and by reason of the movement of the mold a film of glass is spread over the interior of the mold and forms into a cylinder. The arrangement is preferably such that one end of the cylinder fastens to a draw ring which is detachable from the mold, so the cylinder may be removed from the mold, and the draw ring will provide means for manipulating it.

According to another form of my invention, I may omit the mold and throw the molten glass outwardly against the drawring, and then raise the draw-ring and the adhering glass in the operation of forming the hollow article.

The invention may be more fully understood by reference to the accompanying drawings, in which:

Fig. 2 is a section on line II—II of Fig. 1 on a reduced scale;

Fig. 3 is a section on line III—III of Fig. 1;

Fig. 4 is a top view on a reduced scale of the machine;

Fig. 5 is a detail view showing the top of a portion of the draw-ring and drive-ring at the top of the mold;

Fig. 6 is a side view of the part of the apparatus shown in Fig. 5 looking at the outside of the drive-ring;

Fig. 7 is a detail top plan view of the mechanism for expanding the mold;

Fig. 8 is a detail view of a windlass used in connection with the apparatus; and Fig. 9 is a view of a portion of the apparatus in which a modified form of mold is shown.

Figure 1:
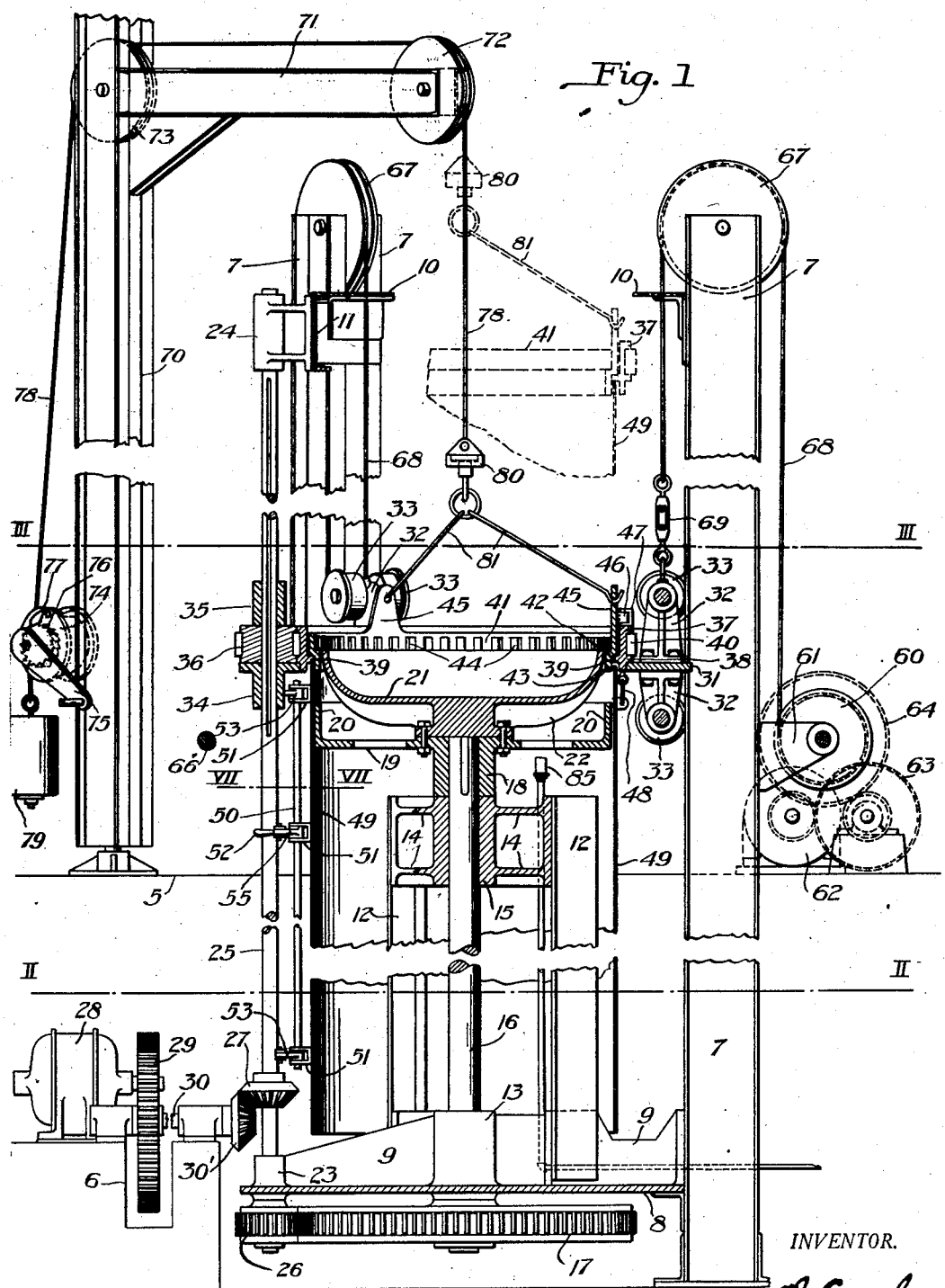
Fig. 1 is a broken side elevation of a machine constructed in accordance with my invention.

In the drawings, 5 represents the ground line, and 6 a foundation below the ground level. Extending upward from the foundation are a plurality, preferably three, vertical columns preferably formed of spaced apart channel irons 7 with the channels turned outwardly. The bottoms of the columns are connected by a plate 8 having webs 9 thereon. The tops of the three columns are connected and braced by means of a V-shaped plate 10 (see Fig. 4) having depending channel irons 11 thereon to give it rigidity. By reason of member 10 being V-shaped, one side of the supporting frame is open, as shown clearly in Fig. 4.

Secured to the webs 9 are vertical angle irons or supporting members 12. Positioned at the center of plate 8 is a journal 13. Connecting the tops of vertical members 12 is a suitable web 14 in the center of which is a journal 15 in alinement with journal 13. Passing through journals 13 and 15 is a shaft 16, the lower end of which extends below the plate 8 and has a large gear wheel 17 fixed thereto. On the upper projecting end of shaft 16, and keyed or otherwise fixed thereto, is a hub 18 from which extends a web 19 having a vertical flange 20 on the periphery thereof. This flange forms a guide and centering device, as hereinafter described.

Bolted or otherwise secured to the top of hub 18 in such manner that it is centrally positioned, is a basin or dish shaped pot or receptacle 21 for molten glass. The bottom of the receptacle may be strengthened by ribs 22. Upon rotation of gear wheel 17, flange 20 and receptacle 21 will be rotated through shaft 16.

Journaled at the bottom in plate 8 at 23 and at the top of the supporting structure in bearing 24 on channel 11 is a vertical shaft 25 which projects below plate 8 and has its lower end provided with a pinion 26 which meshes and drives gear wheel 17. Fixed to shaft 25 is a bevel gear 27. Shaft 25 is driven through the gear 27 by a suitable variable speed electric or other motor 28, reducing gear 29, shaft 30, and bevel gear 30' meshing with gear 27.

At 31 is a vertically movable supporting ring comprising an annular plate on which are brackets 32 having transverse shafts therein on which are flanged rollers 33 adapted to engage the sides of the channel members 7, the flanges engaging the edges of the channel irons to keep the supporting ring in vertical alinement. A bushing 34 in plate 31 slidably engages shaft 25 which passes therethrough and spaced above this bushing and carried by the supporting ring is a second bushing 35. Between bushings 34 and 35 is a pinion 36 which is splined to shaft 25. This pinion is of the same diameter as pinion 26 and preferably has the same number of teeth.

Rotatably mounted on plate or ring 31 is drive ring 37 having an outwardly projecting flange 38 and an inwardly extending flange 39. At 40 is an annular rack formed on the ring meshing with pinion 36. The diameter of the annular rack is substantially the same as that of gear wheel 17 and preferably has the same number of teeth. The flange 38 engages the top of plate 31 and the plate thus forms a bearing for the drive ring. By reason of pinions 27 and 36 being the same size and gear 17 and rack 40 being the same size, the drive ring 37 and the receptacle 21 are driven at equal speeds upon rotation of shaft 25.

Flange 39 forms a seat for a removable draw-ring 41 having a shoulder 42 thereon which, in the lowermost position of plate 31, as shown in Fig. 1, is even or level with the top of receptacle 21. Depending from the shouldered portion of the ring is a flange 43 which extends downwardly for only a short distance. As shown in Fig. 5, the interior of ring 41 is serrated or provided with suitable projections 44. Projecting upwardly from the ring 41 are ears 45 to which lifting means, hereinafter described, are attached. To prevent relative rotation between the drive ring 37 and the draw-ring 41, suitable means are provided, such as a projection 46 on each of ears 45 adapted to seat between two lugs 47 on the drive ring, as shown in Figs. 5 and 6.

Suspended from the drive ring 37 by means of links or other suitable devices 48, is a cylindrical sheet metal cylinder 49. The cylinder is divided longitudinally, preferably at two or more places, and the sections are secured together as shown in Figs. 1 and 7 to permit the cylinder to be expanded. The mechanism for holding the sections together comprises a longitudinally extending rotatable shaft 50 carried on lugs 51 on one of the sections. Fixed to the shaft is a handle 52 and fixed on the shaft at other suitable points are arms 53, which, if desired, might also be handles. Pivoted on the other section in lugs 54 are links 55 which have one of their ends pivoted to handle 52 or to members 53.

By rocking lever 52 from the full line position in Fig. 7 to the dotted line position, the sections will be forced apart to expand the mold cylinder. When the mold is contracted, the handle is in the full line position, as shown in Fig. 7, and in this position the parts are self-locking, and they do not project sufficiently to interfere with the rotation of the cylinder. The upper end of the cylinder telescopes over depending flange 43 on draw-ring 41 (see Fig. 1).

It will be understood that the contour or configuration of the mold may be formed to make special shapes of hollow or cylindrical bodies; thus, for example, the walls of the mold may be corrugated, thereby permitting corrugated glass to be made; the walls may also be ribbed, if ribbed glass is to be made.

In order that the mold cylinder may be raised gradually and evenly as it rotates, drums 60, supported in brackets 61 secured to the vertical posts 7, are provided (see Fig. 3). These drums are all driven in unison at the same speed by a motor 62, reducing gearing 63, gears 64, miter gears 65, and shafts 66. At the top of each of the columns formed by the structural members 7 is a sheave 67. A cable 68 is secured to each of the drums and passes over sheave 67. The other end of each of the cables 68 connects with the brackets 32 on the upper ends of ring 31, through turn-buckles 69. Thus, upon rotation of drums 60, the cylindrical mold will be moved upwardly, the rollers 33 forming a guide to keep the parts centered.

Mounted beside the supporting frame and apparatus heretofore described, is a pivotally mounted derrick post 70 having a laterally extending arm 71 adapted to be swung over the top of the structure supported by columns 7. In the outer end of the arm is a sheave 72 and in the post is another sheave 73. Mounted on the post near the ground level is a windlass 74 with a crank or other suitable operating means 75 and a ratchet 76. At 77 is a pawl for engagement with the ratchet wheel. A cable 78 having a weight 79 at its end passes over the drum 74, and one or two turns is wrapped therearound. The cable passes on up over sheave 73, out over sheave 72, and the end hangs down and connects with one member of a swivel 80. On the other member of the swivel is a ring to which connect rods 81 whose outer ends pass through openings or ears 45 on the draw-ring.

With this arrangement, the swivel permits the draw-ring 41 to rotate as the drive-ring 37 rotates, without twisting the cable 78. As the draw-ring moves upwardly, weight 79 keeps the cable from becoming slack. Then, when the drive ring has been raised to its uppermost limit and is again lowered, the pawl and ratchet on the windlass prevent the draw-ring from lowering, and it is thus held in suspension. By releasing the pawl at any time, the draw-ring may be lowered.

Mounted beneath web 19 is a gas burner or other suitable heater 85, the flame of which passes through openings in the web and keep the receptacle 21 hot.

In operation, the parts are first in the position shown in Fig. 1, with the exception that the draw-ring is held in elevated position. A sufficient amount of molten glass is placed in the receptacle, which has previously been heated. The draw-ring is then lowered to the position shown in Fig. 1, and motor 28 is thrown into operation. The rotation of receptacle 21 throws the molten glass out onto the shoulder of the draw-ring. The glass freezes to the projections on the draw-ring, which is also rotating. Motor 62 is then thrown into operation and the revolving mold casing or cylinder 49 is gradually raised, while the receptacle 21 does not change its position. The glass being thrown out of the receptacle centrifugally spreads over the cylinder as it moves up. The thickness of the glass may be regulated by varying the speed of either of the motors 28 and 62. When the cylinder has reached its uppermost limit, it is expanded and the glass, having chilled, will not freeze to it. The motor 62 is reversed and the drive-ring 37 is lowered, but draw-ring 41 with the depending glass cylinder remains suspended. The bottom of the cylinder may then be sheared from the molten glass remaining in the receptacle 21. The derrick post 70 is then rotated and the cylinder is swung out from over the receptacle, the frame being open on one side, permitting this.

The cylinder of glass so formed may then be manipulated in any suitable manner. A new draw-ring can be substituted and the next cylinder formed. When the cylinder of glass is removed from the draw-ring, the part of the glass next the ring is cut off and the ring cleaned so that it may be used again.

In the modification shown in Fig. 9, the parts are all similar to those described in connection with the other figures, with the exception of the mold indicated at 49ª. This mold is shown as having a series of corrugations therein in order to produce a corrugated cylinder. The corrugations could be arranged in a desired way and could run in any desired or preferred direction. By increasing the curvature of the corrugations as shown in Fig. 9 and decreasing the diameter of the receptacle 21 and the accompanying parts, a series of globe-like articles might be formed which, if desired, could then be detached from each other.

In the drawings, the height of the machine is shown as being very much reduced owing to broken away portions. In actual practice, the machine might be forty or more feet in height, and the cylindrical mold would be about half of that height. The flange 20 serves to prevent the cylindrical mold from swinging out of center as the cylinder moves upwardly.

The drawings and description disclose one embodiment of my invention, but it is obvious that various changes may be made in the apparatus shown and within the scope of the appended claims.

What I claim is:

1. The method of forming hollow glass articles which consists in rotating a mass of molten glass in a receptacle and thereby centrifugally cause the glass to flow outwardly over the edge of the receptacle, freezing the first of the overflow to a bait ring rotating with the receptacle, and then moving the bait ring longitudinally of its axis of rotation while maintaining the ring and receptacle in rotation.

2. The method of forming hollow glass articles which consists in rotating a mass of molten glass to throw the glass outward centrifugally and spreading it over the interior of a mold while effecting a relative longitudinal movement between the mold and the molten glass.

3. The method of forming hollow glass articles which consists in rotating a mass of molten glass to throw the glass outward centrifugally and spread it over the interior of the mold while effecting a relative longitudinal movement between the mass of molten glass and the mold.

4. The method of forming glass cylinders which consists in rotating a mass of molten glass to throw the glass outward centrifugally and spreading it over the interior of a rotating mold to form the article while the mold is moving parallel to the axis of rotation.

5. Apparatus for the manufacture of glass cylinders including a rotatable receptacle, a mold surrounding the receptacle, means for rotating the receptacle, means whereby one may be moved longitudinally relatively to the other while forming the cylinder.

6. Apparatus for the manufacture of hollow glass articles including a rotatable receptacle, a rotatable mold, means whereby one may be moved longitudinally relatively to the other while forming the article, and means for rotating the receptacle and the mold.

7. The method of forming hollow glass articles of a desired shape which consists in rotating a mass of molten glass to throw the glass outward centrifugally and spreading it over the interior of a mold having the desired configuration while effecting a relative longitudinal movement between the mold and the molten glass, at substantially the same speeds.

8. Apparatus for the manufacture of glass cylinders including a rotatable receptacle, a rotatable mold, means whereby the mold may be moved longitudinally relatively to the receptacle during the formation of the article, and means for rotating the receptacle and the mold.

9. Apparatus for the manufacture of glass cylinders including a rotatable receptacle, a rotatable draw-ring, means for moving the draw-ring longitudinally relatively to the receptacle, means for rotating the receptacle and draw-ring, and a cylindrical mold movable longitudinally with the bait ring.

10. Apparatus for the manufacture of hollow glass articles including a rotatable receptacle, a rotatable draw-ring of slightly larger diameter than the receptacle on which one end of the article is adapted to form, means for effecting a relative vertical movement between the receptacle and the draw-ring while forming an article, and means for rotating the receptacle and means for rotating the draw-ring, said ring in its lowermost position substantially encircling the top edge of the receptacle.

11. Apparatus for the manufacture of hollow glass articles of a desired shape including a rotatable receptacle, a rotatable mold having its interior of the desired configuration, means for rotating the mold and receptacle, and means for effecting a relative longitudinal movement between the mold and receptacle while they are rotating whereby a concurrent spreading and drawing of the articles is effected.

12. Apparatus for the manufacture of glass articles including a rotatable receptacle, a rotatable mold cylinder, means for rotating the receptacle and the mold, whereby the mold may be moved longitudinally relatively to the receptacle, and means for effecting such longitudinal movement.

13. Apparatus for the manufacture of glass cylinders including a rotatable receptacle, a rotatable draw-ring, means for rotating the draw-ring and receptacle, means for moving the draw ring longitudinally relatively to the receptacle, a mold, means for moving the draw ring and mold together, and means for moving the draw ring independently of the mold.

14. Apparatus for the manufacture of glass cylinders including a rotatable receptacle from which molten glass may be flowed centrifugally, means for receiving the glass thus flowed, and means for moving one relatively to the other during the operation of forming a cylinder.

15. Apparatus for the manufacture of glass cylinders comprising a supporting frame, a receptacle supported in the frame, means for rotating the receptacle, a drive ring movable longitudinally in the frame, means for moving the drive-ring longitudinally, means for rotating the drive-ring at the same speed as the receptacle, and a draw-ring and cylindrical mold carried by the drive-ring.

16. Apparatus for the manufacture of glass cylinders comprising a supporting frame, a receptacle supported in the frame, means for rotating the receptacle, a drive-ring movable longitudinally in the frame, means for moving the drive-ring longitudinally, means for rotating the drive-ring at substantially the same speed as the receptacle, a draw-ring carried by the drive-ring, and an expansible cylindrical mold carried by the drive-ring.

17. Apparatus for the manufacture of glass cylinders comprising a supporting frame, a receptacle supported in the frame, means for rotating the receptacle, a drive-ring movable longitudinally in the frame, means for effecting the longitudinal movement of the drive ring, means for rotating the drive-ring at substantially the same speed as the receptacle, a mold cylinder carried by the drive-ring, a draw-ring carried by the drive-ring and movable therewith, and means for effecting a separate movement of the draw-ring.

In testimony whereof I affix my signature in presence of two witnesses.

WALTER O. AMSLER.

Witnesses:
 LOIS WINEMAN,
 W. G. DOOLITTLE.